United States Patent [19]

Storbakken

[11] Patent Number: 4,679,539
[45] Date of Patent: Jul. 14, 1987

[54] VAPOR LOCK CONTROL AND FUEL ECONOMIZER

[76] Inventor: George D. Storbakken, 10677 Ogden Ave., Boise, Id. 83709

[21] Appl. No.: 807,464

[22] Filed: Dec. 10, 1985

[51] Int. Cl.[4] .......................................... F02M 31/00
[52] U.S. Cl. ..................................... 123/557; 123/540
[58] Field of Search ............... 123/555, 556, 557, 540, 123/41.31

[56] References Cited

U.S. PATENT DOCUMENTS

| | | | |
|---|---|---|---|
| 2,711,718 | 6/1955 | Spanjer | 123/555 |
| 3,846,985 | 11/1974 | Michels | 123/556 |
| 4,020,815 | 5/1977 | Hubert | 123/556 |
| 4,056,087 | 11/1977 | Boyce | 123/556 |
| 4,341,194 | 7/1982 | Wolters | 123/555 |
| 4,351,301 | 9/1982 | Allen | 123/557 |
| 4,357,285 | 11/1982 | Martinez | 123/557 |
| 4,393,851 | 7/1983 | Gorans | 123/557 |
| 4,397,288 | 8/1983 | Kellino | 123/557 |
| 4,406,270 | 9/1983 | Simonson | 123/557 |
| 4,440,138 | 4/1984 | Smith | 123/557 |
| 4,475,523 | 10/1984 | Goranflo | 123/557 |
| 4,509,464 | 4/1985 | Hansen | 123/557 |

Primary Examiner—Ronald B. Cox
Attorney, Agent, or Firm—Wayne E. Duffy; Don E. Ferrell

[57] ABSTRACT

An improved fuel vaporizing system includes a fuel atomizer, an air vent stabilizer and a fuel pressure regulator serially interconnected within the fuel supply line. The fuel atomizer includes a hot water jacket for receiving heated engine coolant to thus vaporize fuel passing through a coiled conduit within the jacket, and the air vent stabilizer is utilized to provide a smooth liquid fuel flow to the carburetor while preventing vapor lock. The fuel pressure regulator controls the rate of delivery of the fuel to the carburetor. Excess liquid fuel from the air vent stabilizer is passed through a cooling stabilizer before redelivery to the fuel pump.

The system may further include a hot water preheater which is thermostatically controlled to supply hot water to the fuel atomizer during that time when the engine block coolant is not sufficiently heated, and an air pump may be provided for supplying heated combustion air to the carburetor with the engine exhaust fumes being employed to heat the combustion air.

4 Claims, 6 Drawing Figures

VAPOR LOCK CONTROL AND FUEL ECONOMIZER

BACKGROUND OF THE INVENTION

1. Field of the Invention

The present invention relates to fuel vaporizing systems for use with internal combustion engines, and more particularly pertains to a new and improved fuel vaporizing system which includes the use of the engine cooling water system to effectively vaporize the fuel before delivery to a carburetor.

2. Description of the Prior Art

As can be appreciated, there are numerous fuel vaporizing systems now available for commercial use. For example, U.S. Pat. No. 4,345,570 discloses a typical fuel heating apparatus for vehicles which includes a vaporizer box in combination with a heat exchanger that utilizes engine coolant to effect fuel vaporization. The apparatus disclosed in this patent further includes a mixing chamber for receiving a fuel-air mixture from the vaporizer box for more completely mixing the same prior to introducing the charge into the carburetor.

Another typical example of a conventional fuel vaporization system is to be found in U.S. Pat. No. 4,372,280 which discloses a fuel vaporizer utilizing hot water from an automobile's cooling system to heat gasoline to a vapor state. The vaporized fuel is then mixed with outside ambient air in a separate dry vapor section before delivery to the engine carburetor.

The examples of prior art fuel vaporization systems disclose in the two above-discussed patents are illustrative of the current state of the art. Due to the fact that all of these systems vary in construction from each other, it is difficult to accurately adjudge their effectiveness, and it is probably reasonable to state that the majority of them do operate to improve engine combustion efficiency. However, as can be appreciated, there is a continuing need for improvements in such combustion efficiency and through detailed analysis and testing, it would appear that the present invention substantially contributes to such needed improvements.

SUMMARY OF THE INVENTION

The general purpose of the present invention, which will be described subsequently in greater detail, is to provide a new and improved fuel vaporization system which has all of the advantages of the prior art fuel vaporization systems and none of the disadvantages. To attain this, the present invention envisions the use of a fuel atomizer which is fluidly interconnected within the fuel supply line of an internal combustion engine. The fuel atomizer essentially comprises a coiled copper tube through which the fuel flows, with the coiled copper tube then being positioned within a hot water jacket whereby heated water from the engine coolant supply may be used to raise the temperature of the fuel and thus vaporize the same before delivery to the engine carburetor. During initial start-up of the engine, a thermostatically-controlled water preheater is utilized to supply hot water to the jacket until such time as the engine coolant reaches an effective operating temperature.

Once the vaporized fuel leaves the fuel atomizer, it enters the air vent stabilizer which consists of a baffled and screened chamber. The stabilizer permits a smooth flow of hot liquid fuel into the fuel pressure regulator and from there into the carburetor, while at the same time preventing vapor lock. Fuel not required by the engine is bypassed through a cooling stabilizer to the fuel tank or to the inlet of the fuel pump.

The air coming into the carburetor for combustion is augmented by heated air supplied by an air pump, either from the air pollution system or from the engine exhaust system. The heated air is introduced directly over the fuel jet within the carburetor, and the volume and temperature of the heated air is controlled by a manually operated, three-way metering valve, while the air intake is protected by a check valve and fire screen positioned between the air supply tube and the engine exhaust manifold.

It is therefore an object of the present invention to provide a new and improved fuel vaporization system which has all of the advantages of the prior art fuel vaporization systems and none of the disadvantages.

It is another object of the present invention to provide a new and improved fuel vaporization system which may be easily and efficiently manufactured and which may be assembled and used in a rapid and easily understood manner.

It is a further object of the present invention to provide a new and improved fuel vaporization system which will prove to be of a durable and rugged construction under extended use situations.

Even another object of the present invention is to provide a new and improved fuel vaporization system which is susceptible of a low cost of manufacture with regard to both materials and labor, and which accordingly is then susceptible of low prices of sale to the consuming public, thereby making such constructions economically available to the buying public.

Still yet another object of the present invention is to provide a new and improved fuel vaporization system which provides in the apparatuses and methods of the prior art some of the advantages thereof, while simultaneously overcoming some of the disadvantages normally associated therewith.

An even further object of the present invention is to provide a new and improved fuel vaporization system which may be employed to improve the combustion efficiency of an internal combustion engine.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

DESCRIPTION OF THE PREFERRED EMBODIMENTS

Figure 1:
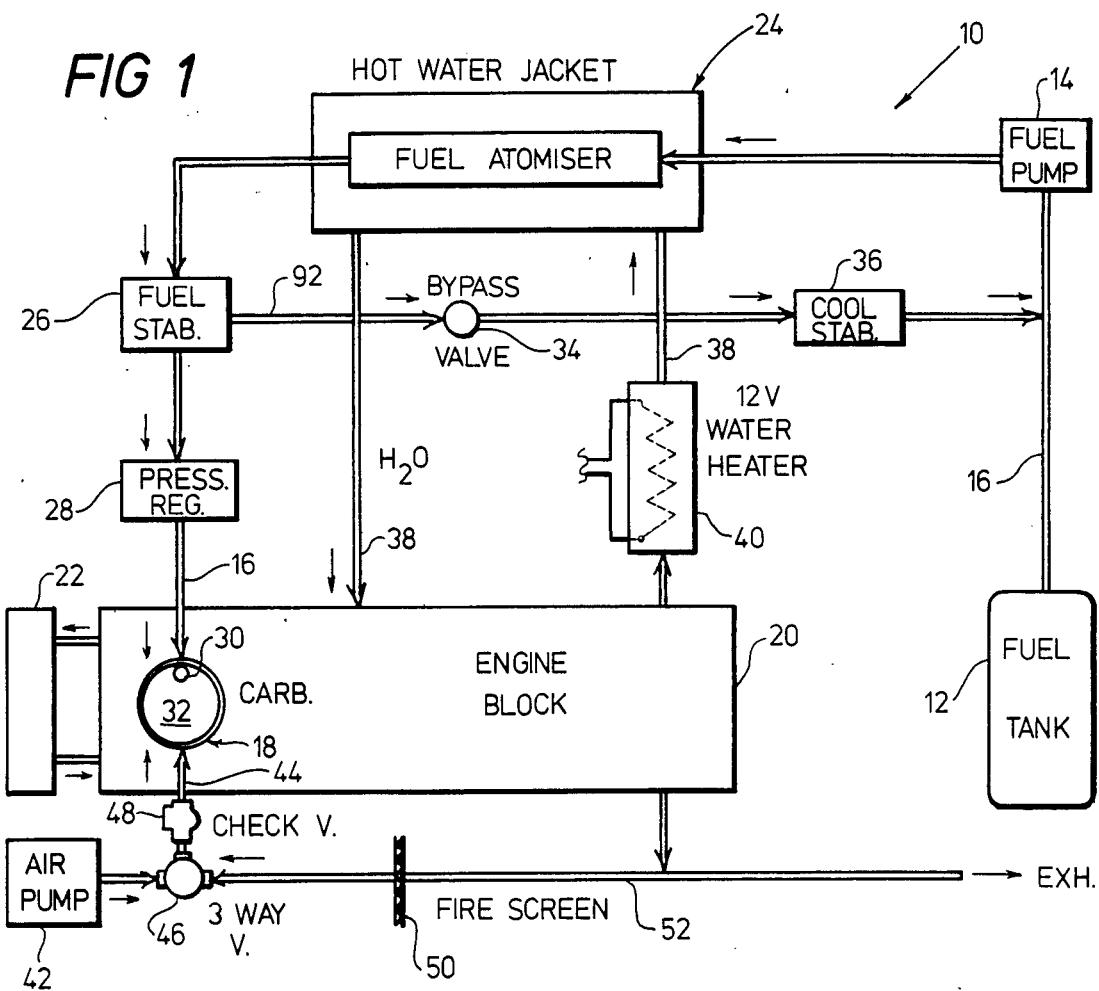
FIG. 1 is a schematic diagram of the fuel vaporization system forming the present invention.

With reference now to the drawings and in particular to FIG. 1 thereof, a new and improved fuel economizer system embodying the principles and concepts of the present invention and generally designated by the reference numeral 10 will be described. In this respect, it can be seen that the fuel economizer system 10 is designed for operable attachment to an existing vehicle fuel system. As shown, the existing vehicle fuel system includes a fuel supply contained within a fuel tank 12 and a fuel pump 14 fluidly interconnected thereto. More particularly, fuel is drawn by the fuel pump 14 through a fuel outlet conduit 16, and is deliverable through the conduit 15 to a conventional carburetor 18 operably mounted to an internal combustion engine block 20. Also conventionally forming a part of the existing engine system is a radiator 22 which directs a coolant through the engine block 20 in a conventional and well understood manner. Of course, all of the system 10 thus far described is of a conventional construction and forms no part of the present invention. In this regard, the present invention, as will be described subsequently, is designed for attachment to the existing engine construction as thus far described.

Continuing with the discussion of the present invention as illustrated in FIG. 1, it will be noted that the same includes a fuel atomizer 24, a fuel or air vent stabilizer 26 and a fuel pressure regulator 28 all serially interconnected in fluid communication with the aforementioned fuel supply conduit 16. After passing through the elements 24, 26, 28 and into the carburetor bowl, the fuel passes in an understood manner through a fuel jet 30 into the carburetor venturi 32 and thence into the engine block 20 for combustion. A metering valve 34 forming a part of the air vent stabilizer 26 permits excess fuel from the stabilizer to pass through a fuel cooling stabilizer 36 back into the fuel conduit 16 on the inlet side of the fuel pump 14.

The invention 10 further includes a conduit 38 which is in fluid communication with the engine coolant system and which serves to facilitate a flow of engine coolant from the engine block 20 through the fuel atomizer 24 and thence back into the block for reheating. A thermostatically-controlled, electrically-powered, water heater 40 is fluidly connected within the conduit 38 and operates to heat the engine coolant during engine startup periods when the coolant is not sufficiently hot. Once the coolant is heated to its operating temperature in the engine block 20, the thermostat in the water heater 40 will cause the water heater to be inoperative until the next startup period.

Also forming a part of the invention 10 is an air pump 42 which operates to supply heated air directly over the aforementioned fuel jet 30 through a conduit 44. The volume and temperature of the heated air is controlled by a manually operated, three-way metering valve 46, and the air intake is protected by a check valve 48 and a fire screen 50. In this regard, the air being supplied by the air pump 42 may be heated by the vehicle air pollution system or vehicle exhaust system 52 as illustrated which then makes apparent the need for the check valve 48 and fire screen 50.

Figure 2:
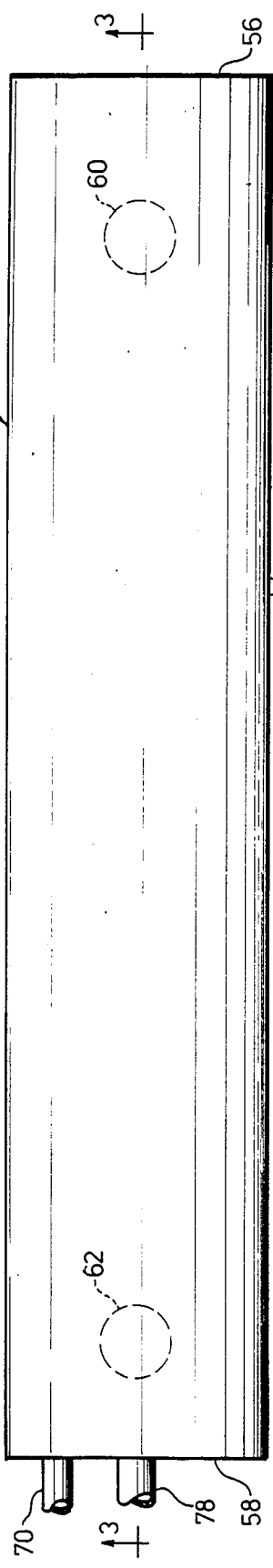
FIG. 2 is a top plan view of the fuel atomizer forming a part of the present invention.
Figure 3:
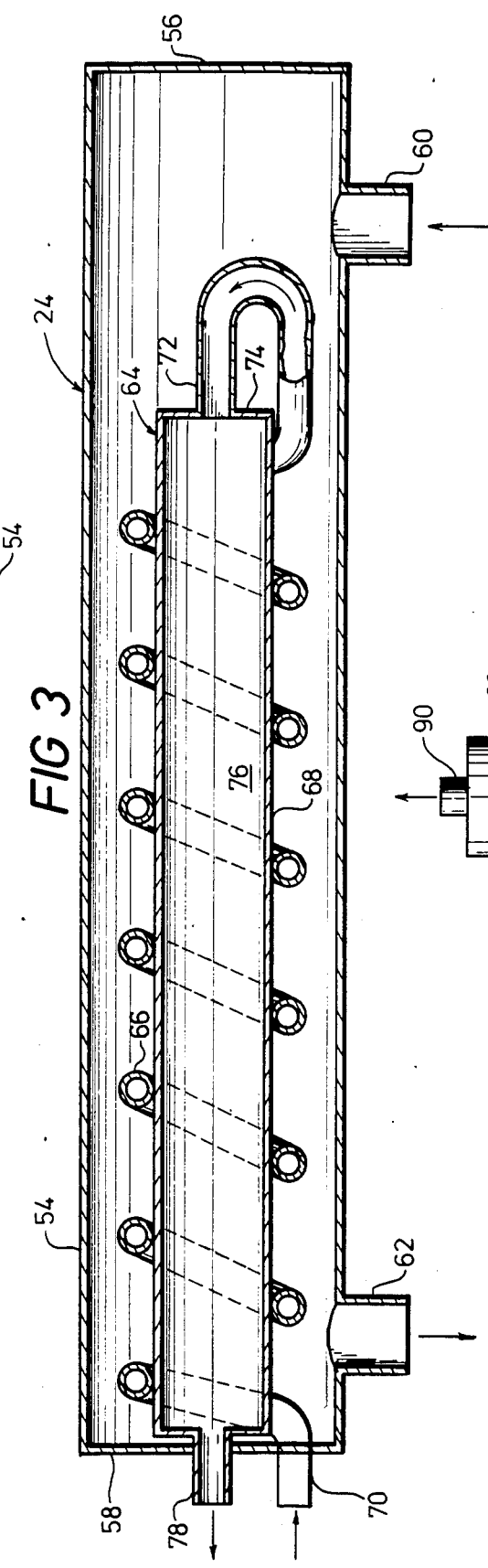
FIG. 3 is a cross-sectional view of the invention taken along the line 3—3 in FIG. 2.

With reference now to FIGS. 2 and 3 of the drawings taken in conjunction with FIG. 1, a more complete description of the fuel atomizer 24 will be provided. In this respect, it can be seen that the fuel atomizer 24 includes an outer hot water jacket 54 through which the heated engine coolant drawn from the engine block 20 is directed. The water jacket 54 in one preferred construction is formed from copper tubing which is approximately 12 inches in length and from one to two and one-half inches in diameter. As illustrated, the water jacket 54 is sealingly closed at its respective ends 56, 58 and is provided with integral attachment nipples 60, 62 which facilitate an attachment of the coolant flow conduit 38 to the respective ends of the jacket.

Positioned internally of the water jacket 54 is a cylindrical chamber 64. The design of the chamber 64 includes a coiled conduit 66 circumferentially positioned about its outer surface 68 with one end 70 of the conduit extending out of the water jacket 54 and serving as a connector for the fuel line 16 and the other end 72 of the conduit being fixedly secured to an end 74 of the chamber 64. As such, fuel directed through the conduit 66 is delivered to the interior 76 of the chamber 64 and is then directed outwardly through a further connection nipple 78 which is fluidly connected to the fuel conduit 16.

Figure 4:
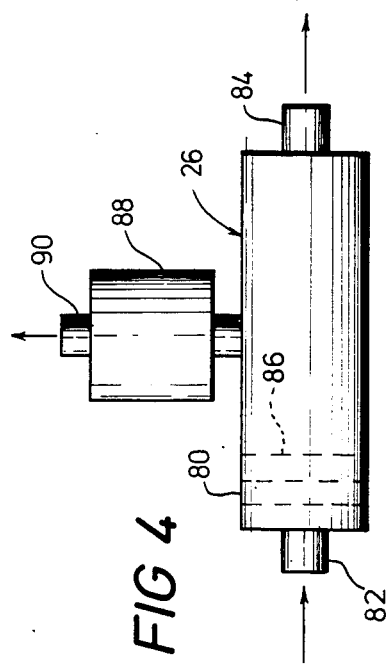
FIG. 4 is a front plan view of the air vent stabilizer forming a part of the present invention.

As illustrated in FIG. 4, the air vent stabilizer 26 consists of a sealed cylindrical chamber with a fuel inlet line connection nipple 82 and a liquid fuel outlet connection nipple 84 integrally attached thereto. The air vent stabilizer 26 is fluidly interconnected within the fuel supply line 16 by means of the connection nipples 82, 84 in an understood manner. The air vent stabilizer 26 includes a plurality of baffles and screens 86 interiorly mounted within the chamber 80, with these screens and baffles serving to control the flow of heated fuel therethrough. More specifically, a further chamber 88 is fluidly interconnected to the chamber 80 and includes an outlet connection nipple 90 which is interconnectible to a conduit 92 that operates to direct excess fuel to the aforementioned bypass valve 34. In effect then, the construction of the air vent stabilizer 26 is such as to permit a directing of heated liquid fuel outwardly through the nipple 84 to the fuel supply line 16, while excess fuel is directed into the chamber 88 and then through the bypass valve 34 to the aforementioned cooling stabilizer 36.

While the fuel cooling stabilizer 36 has not been illustrated in the drawings, its construction is essentially similar to the chamber 80 as shown in FIG. 4, with the exception that no laterally interconnected chamber 88 is utilized. With regard to the internal construction of the cooling stabilizer 36, a preferred embodiment of the invention utilizes 150 mesh copper screen through which the vaporized and liquid fuel passes before redelivery to the inlet side of the fuel pump 14. The copper screen serves to remove excess heat from the fuel so that any vapor condenses back into liquid fuel before delivery to the pump 14.

Figure 5:
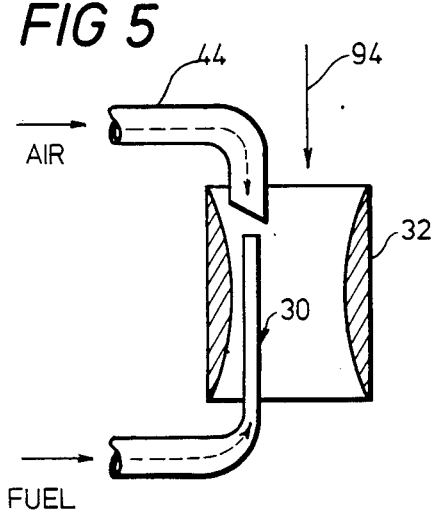
FIG. 5 is a cross-sectional view of the fuel jet arrangement forming a part of the present invention.
Figure 6:
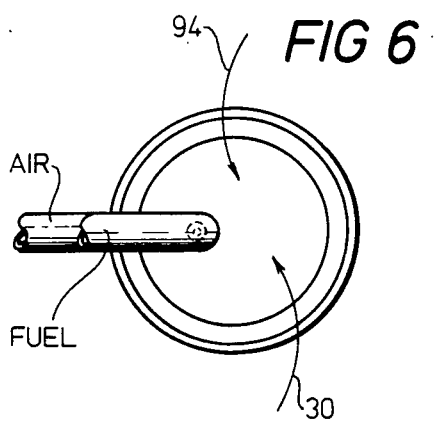
FIG. 6 is a top plan view illustrating the manner of usage of the fuel jet within a carburetor venturi.

As shown in FIGS. 5 and 6, the hot liquid fuel is introduced into the carburetor venturi 32 through a fuel jet 30, while heated air is delivered by the air pump 42 through the conduit 44 positioned directly over the tubular portion 30 as aforementioned. Bulk combustion air 94 is directed in a conventional manner into the venturi 32 proximate the heated air supply tube 44.

While the manner of operation of the invention 10 should now be apparent from the above discussion, a brief summary thereof will be provided. More specifically, it can be seen that once the invention 10 is operably installed on an internal combustion engine system, a more efficient method of providing heated vaporized fuel to the engine will be realized. In effect, fuel is drawn out of the fuel tank 12 by the fuel pump 14 and is then directed through the coiled conduit 66 positioned within the hot water jacket 54 forming a part of the fuel atomizer 24. Heated engine coolant is directed from the engine block 20 through the water heater 40 so that the temperature of the water is approximately 160 degrees Fahrenheit before it enters the atomizer jacket 54. and this heated water serves to heat the fuel flowing through the coiled conduit 66 so that it expands into a vapor and liquid mixture within the chamber 76 before delivery to the air vent stabilizer 26.

In the air vent stabilizer 26, the heated liquid and vaporized fuel mixture is directed through a plurality of baffles and screens 86 with excess fuel vapor and liquid being directed out through chamber 88 to the fuel cooling stabilizer 36. The amount of excess fuel and vapor may be controlled through the use of a bypass metering valve 34, and the cooling stabilizer 36 then effectively turns all of the fuel vapor back into a liquid before redelivery to the fuel pump 14. The heated fuel not passing through the metering valve 34 is directed to a fuel pressure regulator which includes a pressure adjusting screw whereby the amount and pressurization of the fuel deliverable to the carburetor bowl may be selectively controlled. Once the heated fuel passes through the pressure regulator 28, the same is deliverable to the carburetor bowl and thence through the aforementioned fuel jet 30 into the venturi 32 for combustion within the engine block 20.

To further facilitate the combustion process occurring within the engine block 20, the air pump 42 directs a supply of air through the three-way metering valve 46 with this air supply being heated by the exhaust manifold 52 before the air is delivered through the conduit 44 into the carburetor venturi 32. The fire screen 50 and check valve 48 serve to prevent the engine combustion process and products from entering the carburetor 18 in a now apparent manner.

With respect to the above description then, it should be realized that the optimum dimensional relationships for the parts of the invention, to include variations in size, materials, shape, form, temperature range, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new and desired to be secured by Letter Patent of the United States is as follows:

1. A fuel economizer system operably attachable to an existing fuel supply system associated with an internal combustion engine, wherein said existing fuel supply system includes a fuel pump means for drawing fuel from a fuel supply means and delivering said fuel through a fuel supply conduit to a carburetor means attached to said internal combustion engine, said fuel economizer system comprising:
    a. fuel heating means serving to heat said fuel prior to delivery to said carburetor means;
    b. a fuel stabilizer means liquidly interconnected with said fuel supply conduit, consisting of a chamber for receiving heated fuel from said fuel heating means, and serving to direct excess liquid and vaporized fuel to a bypass metering valve means for redelivery to an inlet side of said fuel pump means while also serving to direct a smooth flow of heated liquid fuel to said carburetor means;
    c. a fuel pressure regulator for operably controlling flow rate and pressurization of said fuel to said carburetor means;
    d. said fuel heating means, said fuel stabilizer means, and said fuel regulator so configured that said fuel passes through said fuel heating means first, through said fuel stabilizer means second, and lastly through said fuel pressure regulator before delivery to said carburetor means; and,
    e. fuel cooling stabilizer means for cooling excess fuel delivered to said fuel stabilizer means wherein said excess fuel is redelivered to said fuel pump means.

2. The fuel economizer system as described in claim 1, and further comprising a bypass metering valve means positioned between said fuel stabilizer means and said fuel cooling stabilizer means, said bypass metering valve means serving to control the amount of excess fuel redelivered to said fuel pump means.

3. The fuel economizer system as described in claim 1, wherein:
    a. said fuel heating means utilizes heated engine coolant to facilitate a heating of said fuel before delivery to said carburetor means;
    b. a preheater means for heating said coolant during engine startup periods so that a supply of heated coolant is readily available for said fuel heating means;
    c. said coolant preheater means is electrically operated and thermostatically controlled, with such thermostatic control operating to turn off said coolant preheater means once the engine coolant is at its normal operating temperature;
    d. said engine coolant passes through a hot water jacket means, said hot water jacket means surrounding said fuel supply conduit to facilitate a heating of the fuel contained therein;
    e. said fuel supply conduit is of a coiled construction within said hot water jacket means to further facilitate a heating of said fuel contained therein;
    f. said fuel stabilizer means includes a chamber having a plurality of baffles and screens contained therein, said baffles and screens serving to separate and control a flow of said fuel within said fuel supply conduit.

4. The fuel economizer system as described in claim 1, and further comprising:
    a. a heated air supply means wherein said heated air supply means includes an air pump means and further wherein combustion exhaust gases are utilized to heat air passing through said air pump means before said air is delivered to said carburetor means for combustion;
    b. a three way valve means for facilitating a delivery of heated air to said carburetor means;
    c. utilization by said fuel heating means of heated engine coolant to facilitate a heating of said fuel prior to delivery to said carburetor means;
    d. coolant preheater means for facilitating a heating of said coolant by elecrtical heating means, said coolant preheater means being thermostatically controlled so as to become disabled after said engine coolant rises to a normal operating temperature;

e. fuel cooling stabilizer means operably connected to said fuel cooling stabilizer means, said fuel stabilizer means facilitating a delivery of excess fuel back to an inlet side of said fuel pump means, said fuel cooling stabilizer means further operating to cool said excess fuel prior to such redelivery of said fuel to said fuel pump means.

* * * * *